US007832883B2

(12) United States Patent
Ronda et al.

(10) Patent No.: US 7,832,883 B2
(45) Date of Patent: Nov. 16, 2010

(54) ILLUMINATION DEVICE FOR ILLUMINATING AN OBJECT

(75) Inventors: Cornelis Reinder Ronda, Aachen (DE); Rifat Ata Mustafa Hikmet, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 367 days.

(21) Appl. No.: 11/994,550

(22) PCT Filed: Jun. 30, 2006

(86) PCT No.: PCT/IB2006/052195

§ 371 (c)(1), (2), (4) Date: Jan. 3, 2008

(87) PCT Pub. No.: WO2007/007220

PCT Pub. Date: Jan. 18, 2007

(65) Prior Publication Data

US 2008/0219004 A1 Sep. 11, 2008

(30) Foreign Application Priority Data

Jul. 8, 2005 (EP) .................................. 05106246
Sep. 9, 2005 (EP) .................................. 05108295

(51) Int. Cl.
*G03B 15/02* (2006.01)

(52) U.S. Cl. ......................... 362/18; 362/277; 362/319; 396/164

(58) Field of Classification Search ..................... 362/3, 362/16–18, 319, 277; 396/164, 175
See application file for complete search history.

(56) References Cited

U.S. PATENT DOCUMENTS

| | | | | |
|---|---|---|---|---|
| 4,190,330 | A | 2/1980 | Berreman | |
| 5,188,760 | A | 2/1993 | Hikmet et al. | |
| 5,260,732 | A * | 11/1993 | Goto et al. | 396/175 |
| 5,424,927 | A | 6/1995 | Schallet et al. | |
| 5,762,823 | A | 6/1998 | Hikmet | |
| 5,798,057 | A | 8/1998 | Hikmet | |
| 6,014,197 | A | 1/2000 | Hikmet | |
| 2004/0145905 | A1 | 7/2004 | Strazzanti | |
| 2005/0007767 | A1 | 1/2005 | Fischer et al. | |

FOREIGN PATENT DOCUMENTS

| | | |
|---|---|---|
| DE | 19535295 | 3/1996 |
| DE | 20313626 | 3/2008 |
| EP | 0578827 B1 | 1/1994 |
| WO | 9909351 | 2/1999 |
| WO | 03069380 | 8/2003 |
| WO | 2004059565 A1 | 7/2004 |

* cited by examiner

*Primary Examiner*—Stephen F Husar

(57) ABSTRACT

An illumination device (1) for illuminating an object comprising a light source (2) to emit light (21), an adjustable optical element (3) for adjusting the light (21) originated from the light source (2) into adjusted light (31), and a controller (4) for controlling at least one element of a group of elements comprising the adjustable optical element (3) and the light source (2) in response to an adjusting control signal (71) via at least one driving signal (75, 76).

18 Claims, 8 Drawing Sheets

ILLUMINATION DEVICE FOR ILLUMINATING AN OBJECT

Figure 1:
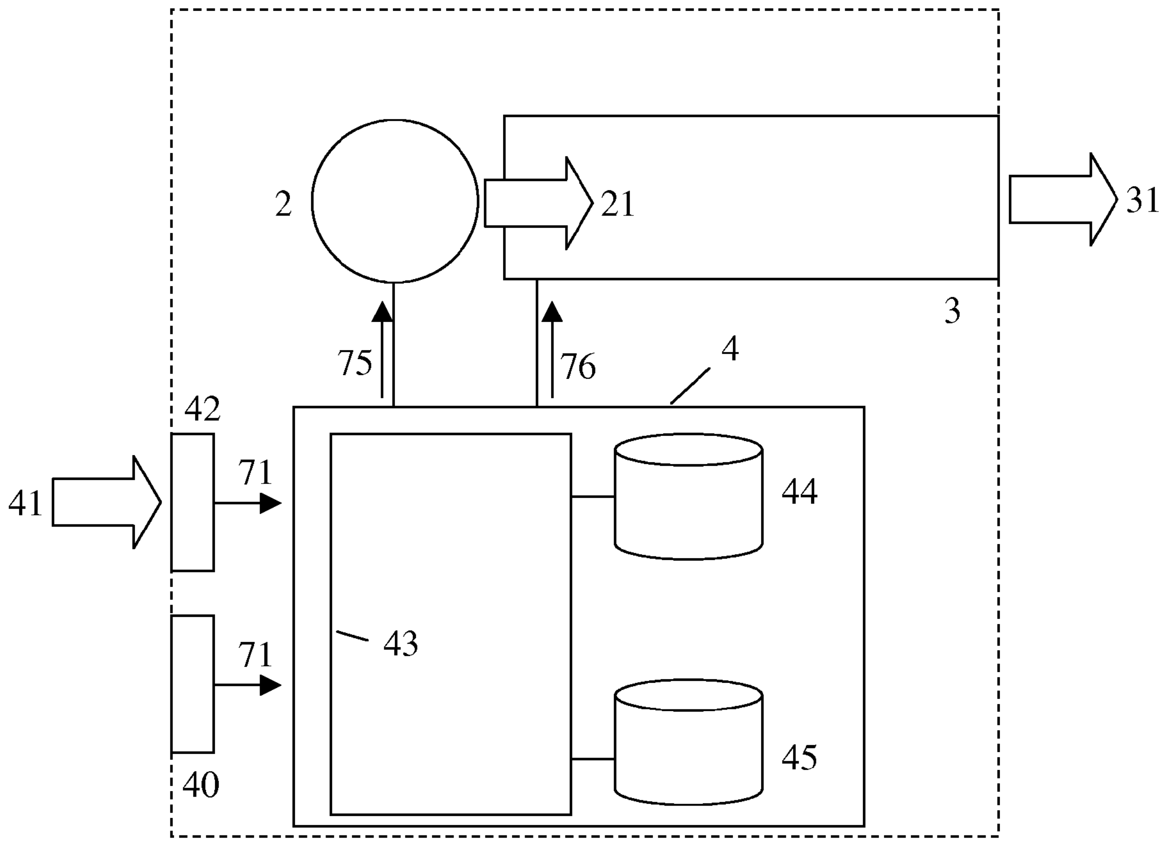

The invention relates to a illumination device to illuminate an object, to an optical device comprising the illumination device, to a controller for use in the illumination device and to a computer program product.

Examples of such an illumination or optical device are (pocket) lanterns, (pocket) torches, flash lights, illuminating lights, spectators, telescopes, (spy) glasses, still picture cameras, motion video cameras, mobile phones with camera functions as well as front lights, back lights, signal lights and interior lights for car applications.

A prior art device is known from US 2005/0007767 A1, which discloses a light emitting diode flash light comprising an array of one or more light emitting diodes (light source) and a light pipe (an adjustable optical element). The light pipe comprises one or more masks and one or more lenses. As disclosed in its paragraph 0044, a user can shift a lens for focusing the light originating from the light emitting diodes on an object to be illuminated. The prior art device is disadvantageous, inter alia, in that it is relatively user unfriendly.

It is an object of the invention, inter alia, to provide an illumination device which is relatively user friendly.

Further objects of the invention are, inter alia, to provide an optical device comprising an illumination device, a controller for use in a illumination device and a computer program product which are relatively user friendly.

The object is solved by an illumination device for illuminating an object comprising

- a light source to emit light,
- an adjustable optical element for adjusting the light originated from the light source into adjusted light, and
- a controller for controlling at least one element of a group of elements comprising the adjustable optical element and the light source in response to an adjusting control signal via at least one driving signal.

By providing the illumination device, it is no longer necessary to shift a lens by hand for adjusting the light originating from the light source or to adjust the required intensity of light manually. Instead of that, the controller adjusts light intensity and beam shape of the light originating from the light source in a more automatic way. As a result, the device according to the invention is more user friendly.

It should be noted that the object can be illuminated directly or indirectly for example via reflections. The adjusting control signal is for example an electric signal, a magnetic signal, an electromagnetic signal, an optical signal or an ultra sound signal.

The device according to the invention is further advantageous, inter alia, in that it offers an increased number of possibilities to a user, as also discussed below.

In different embodiments the light source may be arranged to provide continuous light (for example for a motion video camera) or may be arranged to provide flashing light (for example for a photo camera) or may be arranged to provide a combination of continuous light and flash light (for example for motion video and photo cameras) in response to a driving signal. A continuous light could also be applied when using the illumination device for example as a torch lamp.

In an embodiment a combination of continuous and flash light provided by the light source can be applied for red eye reduction, where a continuous light is emitted before flashing the object to take the picture. In another embodiment continuous light (e.g. of low intensity) supports the user in a dark environment to aim at the object before flashing the object to take a picture and/or will support the focusing procedure of a photo camera or a video camera before taking a photo or a movie.

In another embodiment the light source is arranged to provide continuous light and/or flash light of different intensities for different time intervals. If light with only the intensity difference between required intensity and the intensity of the environmental light is applied by the light source to take a photo or a movie, one can safe energy to enlarge the operationable time of the illumination device. In order to achieve the right intensity of light the light source may be fully dimmable.

In another embodiment the light source comprises at least a light emitting diode or a xenon lamp or a halogen lamp. Preferably, light emitting diodes can be used for flashing as well as for non-flashing situations. The light source explicitly included also an array of diodes. The array of diodes can be driven equally or individually.

In another embodiment the adjustable optical element is arranged to provide adjusted light comprising a beam with an adjustable cone angle and/or an adjustable direction to achieve optimized illumination of a large variation of objects. The objects can be inhouse or outside the house. Examples of optical devices with adjustable optical elements are (pocket) lanterns, (pocket) torches, flash lights, illuminating lights, spectators, telescopes, (spy) glasses, still picture cameras, motion video cameras, mobile phones with camera functions as well as front lights, back lights, signal lights and interior lights for car applications. For instance, the light direction of car front lights can be adjusted high or low to illuminated different parts of a road to the cone angle can be adjusted in order to illuminated a wider or a more narrow part of a road.

In another embodiment the adjustable optical element is arranged to provide adjusted light with an adjustable aspect ratio of the light beam, e.g. 4:3 or 16:9 aspect ratios, to adapt the beam shape to a selected aspect ratio of the movie or the photo to be taken.

In another embodiment the adjustable optical element comprises at least one element of the following group of optical elements comprising electro wetting lens, a liquid crystalline lens, a controllable scattering element, a controllable diffraction, refraction element and reflection element. Here, a lens may comprise a single lens or a lens array. By for example supplying an alternating current voltage with an adjustable amplitude to a liquid crystalline element, a collimation of a beam passing through the liquid crystalline element can be adjusted. By for example supplying an alternating current voltage with an adjustable amplitude to an electro wetting lens, the fluid in the electro wetting lens can be made convex or concave. The avoidance of mechanical moving parts to adjust the light compared to prior art leads to an improved device reliability making this invention even more user friendly.

In another embodiment the adjustable optical element comprises a liquid crystalline refractive index gradient element. Such an element is also known as GRIN element.

In another embodiment the adjustable optical element comprises at least one passive beam shaping element and the controllable scattering element placed between the light source and the passive beam shaping element. This claim explicitly includes the case of more than one passive beam shaping elements and the controllable scattering element placed between the passive beam shaping elements.

In another embodiment the adjusting control signal is generated by a user.

In another embodiment the illumination device further comprises an interface to receive at least one adjustable control signal from an optical device comprising a video camera, a photo camera or a device with a camera function. With such an interface, the illumination device can easily be used as an accessory unit for an optical device such as spectators, telescopes, (spy) glasses, photo cameras, video cameras or a mobile phones with a camera function.

This invention further relates to an optical device comprising an illumination device according to this invention and a zooming lens for shooting the object where the adjusting control signal is derived from a zooming control signal controlling zooming of the zooming lens. This optical device comprises a consumer product such as a spectator, a telescope, a (spy) glass, a photo camera, a motion video camera or a mobile phone with a camera function. In camera devices, image sensors based on charge coupled device technologies or complementary metal oxide semiconductor technologies may be used, and/or conventional films may be used. Therefore, the word “shooting” is not to be taken too restrictedly. The zooming control signal being generated by a user and the adjusting control signal being derived from the zooming control signal. By deriving the adjusting control signal from the zooming control signal, the user’s zooming is automatically converted via the adjustable optical element into an adjustment of the light, for example such that the light is focused just before, on or just after a position of the object. In addition, a light intensity control signal may further be derived from the zooming control signal, to automatically convert the user’s zooming into an adjustment of the intensity of the light source.

In another embodiment the optical device further comprises an auto-focus unit where the adjusting control signal is derived from the auto-focusing control signal generated by the auto-focus unit. By deriving the adjusting control signal from the auto-focusing control signal, the auto-focusing is automatically converted into an adjustment of the light, for example such that the light is focused just before, on or just after a position of the object. In another embodiment the adjusting control signal is derived from a light intensity control signal generated by the object detector unit or the auto-focus unit to automatically adjust the intensity of the light source. Here the intensity of the light source can be adjusted in response of the present environmental light to eliminate the intensity gap between present light and required light to take a movie or a photo. Also during flash operation, the flash light intensity can be decreased in response of the light received on the picture sensor or conventional film.

Embodiments of the controller according to the invention and of the computer program product according to the invention correspond with the embodiments of the illumination device according to the invention.

The invention is based on the insight, inter alia, that the shifting of a lens by hand or adjusting the light intensity is relatively user unfriendly, and is based on the basic idea, inter alia, that a controller should do the controlling of the adjustable optical element.

The invention solves the problem, inter alia, to provide an illumination device and an optical device which are relatively user friendly, and is further advantageous, inter alia, in that it offer an increased number of possibilities to a user, as described above.

These and other aspects of the invention will be apparent from and elucidated with reference to the embodiments(s) described hereinafter.

Figure 2:
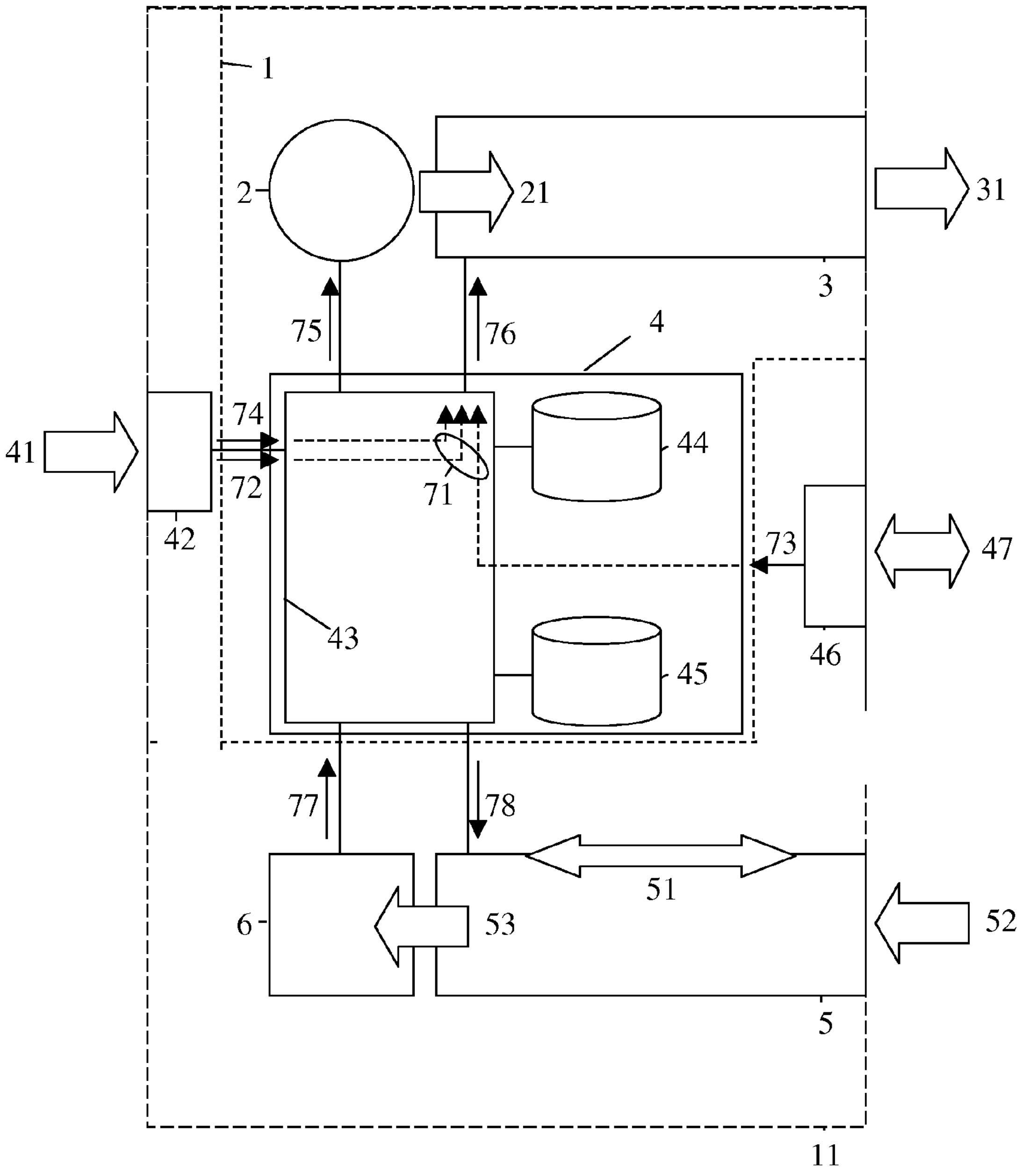
Figure 3:
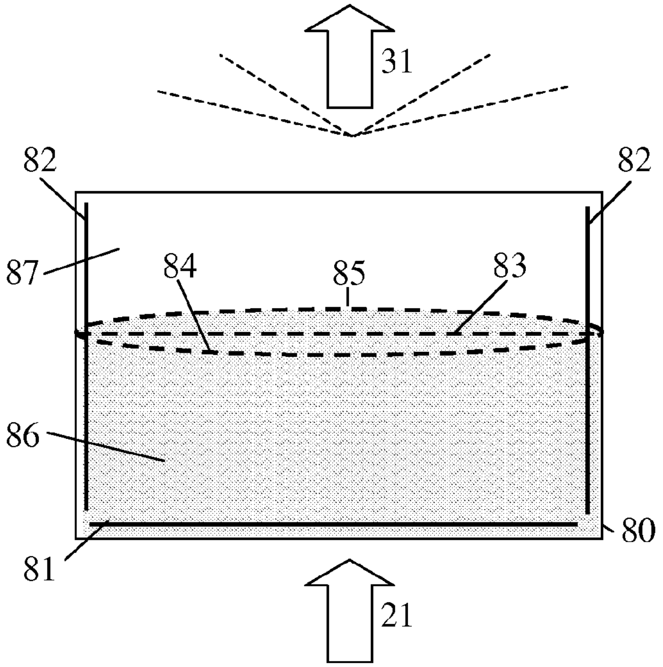
Figure 4:
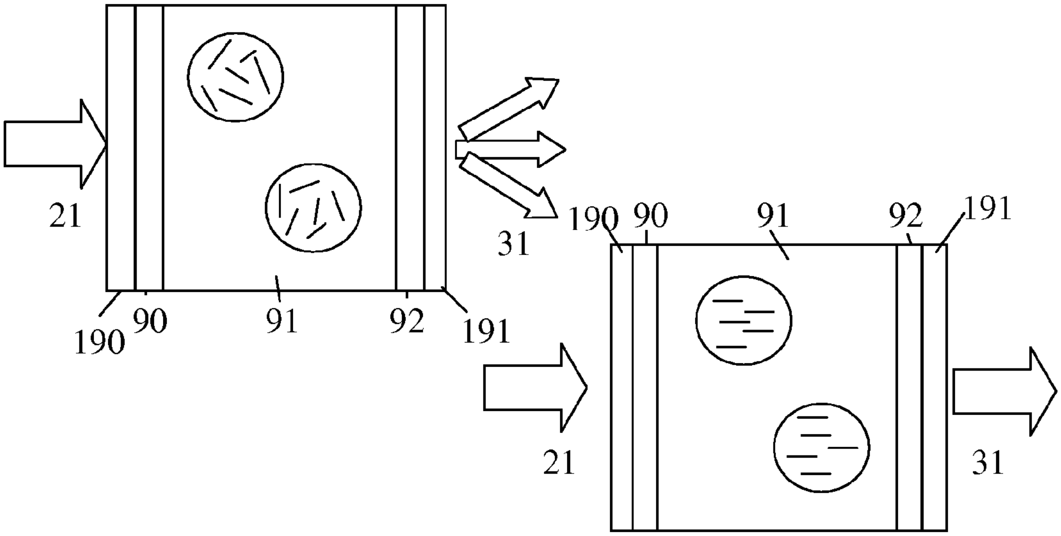
Figure 5:
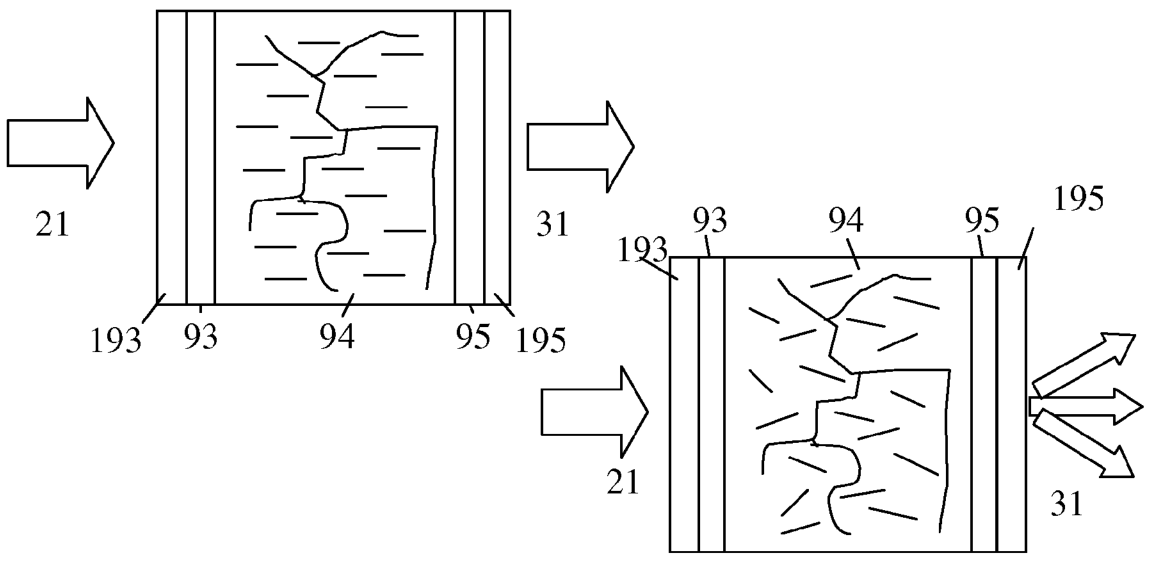
Figure 6:
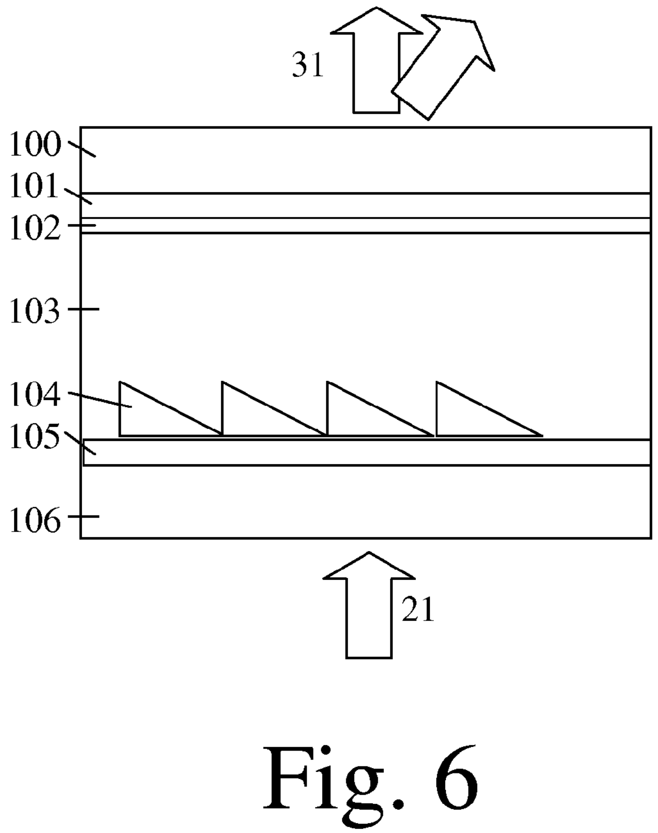
Figure 7:
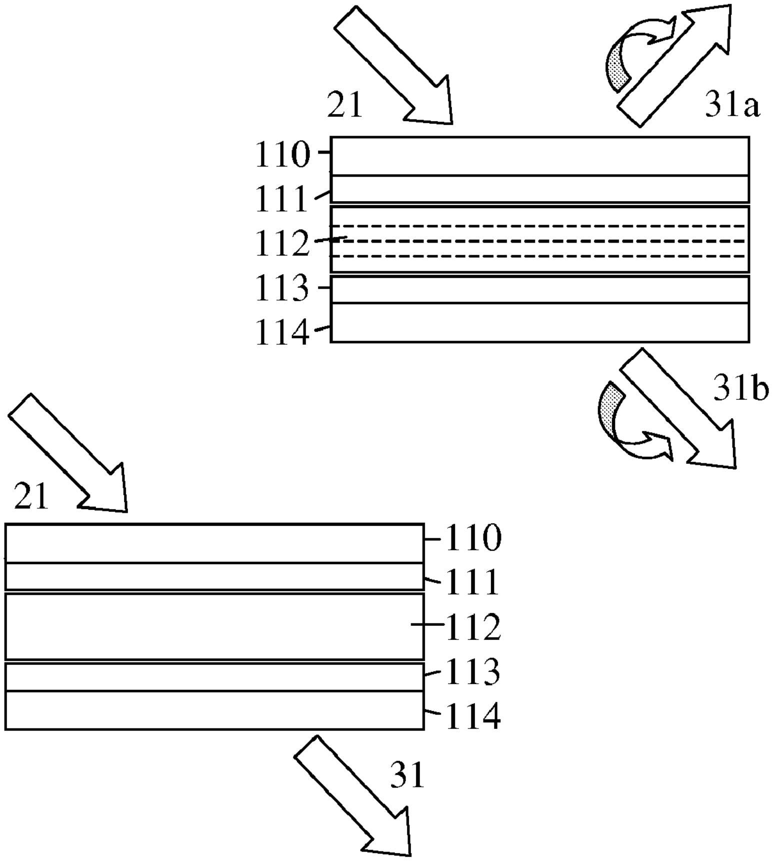
Figure 8:
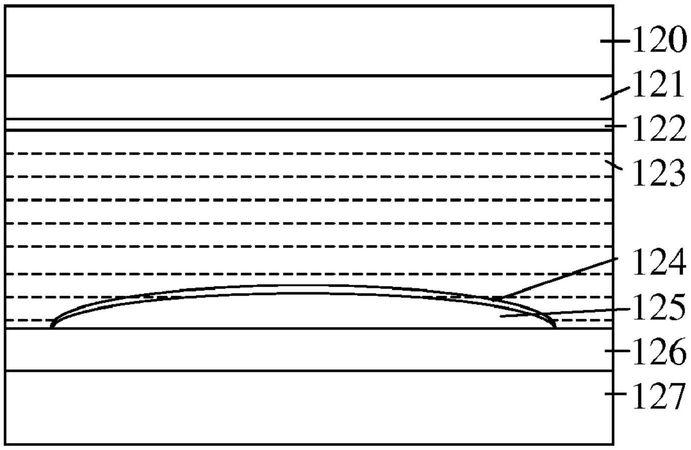
Figure 9:
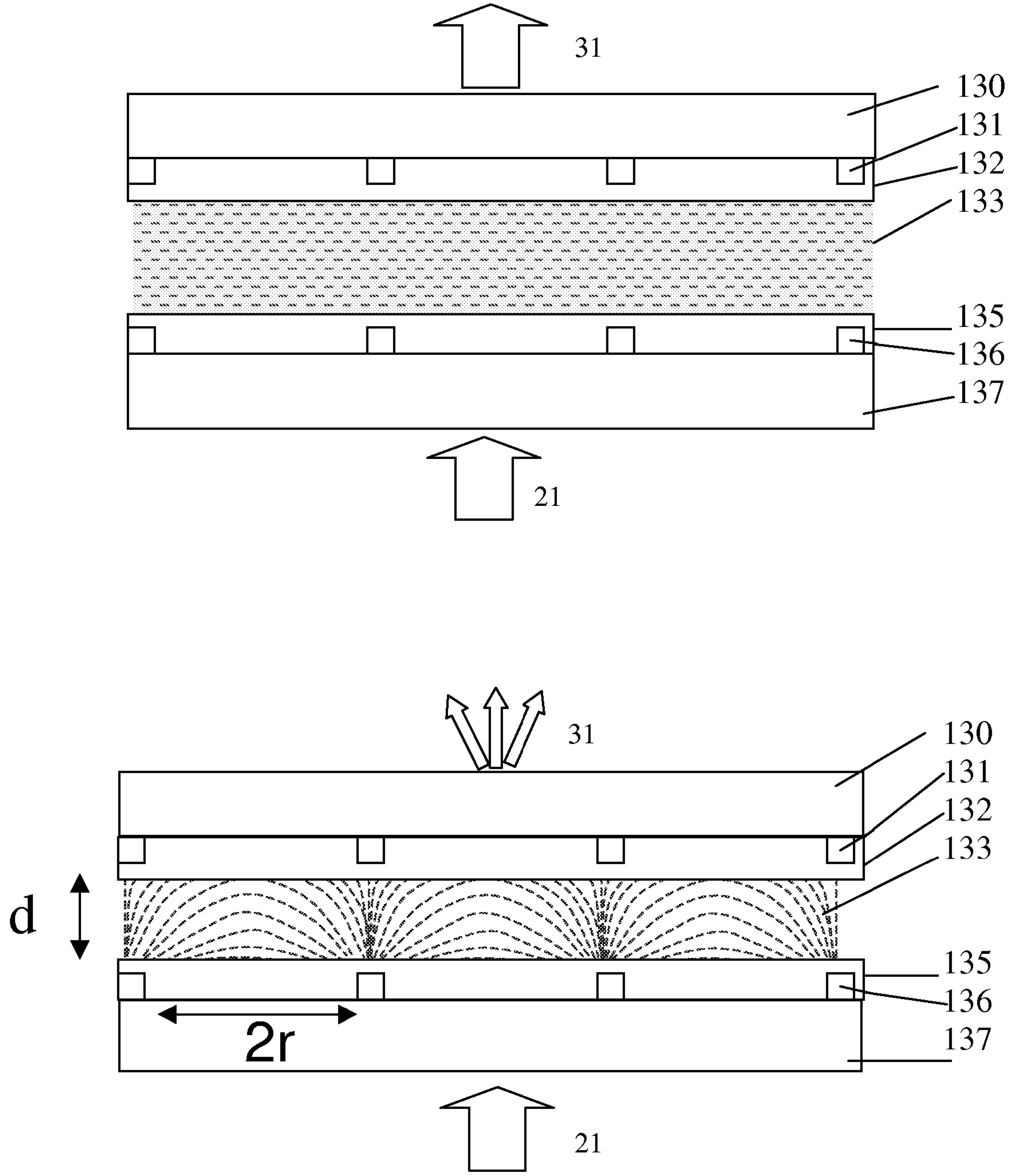
Figure 10:
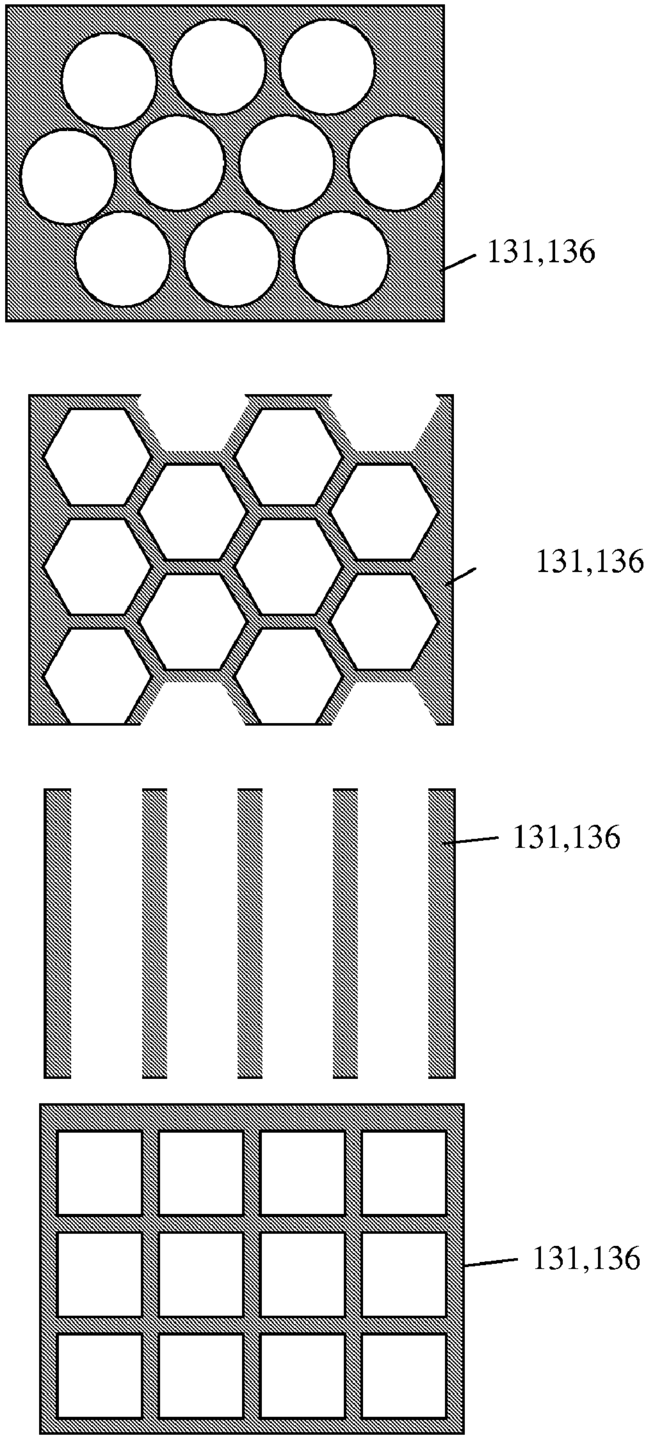

In the drawings:

FIG. 1: shows diagrammatically an illumination device according to the invention comprising a controller according to the invention FIG. 2: shows diagrammatically an optical device according to the invention comprising a controller according to the invention, FIG. 3: shows diagrammatically a first embodiment of an adjustable optical element for adjusting light originating from a light source, FIG. 4: shows diagrammatically a second embodiment of an adjustable optical element for adjusting light originating from a light source, FIG. 5: shows diagrammatically a third embodiment of an adjustable optical element for adjusting light originating from a light source, FIG. 6: shows diagrammatically a fourth embodiment of an adjustable optical element for adjusting light originating from a light source, FIG. 7: shows diagrammatically a fifth embodiment of an adjustable optical element for adjusting light originating from a light source, FIG. 8: shows diagrammatically a sixth embodiment of an adjustable optical element for adjusting light originating from a light source, FIG. 9: shows diagrammatically a seventh embodiment of an adjustable optical element for adjusting light originating from a light source, and FIG. 10: shows various electrode patterns which can be used in the embodiment shown in FIG. 9.

Figure 11:
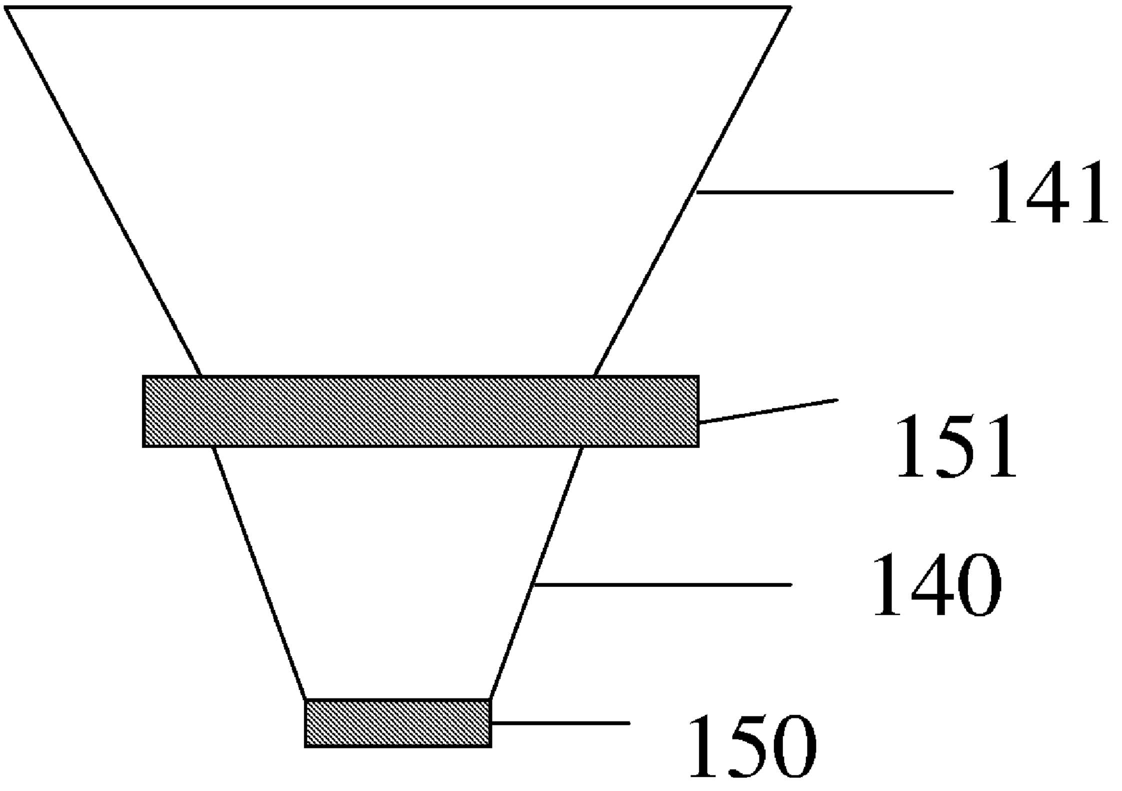

FIG. 11: shows a schematic configuration where the light source and passive beam shaping elements and active elements can be combined for beam shaping and light distribution.

An illumination device 1 according to the invention is shown in FIG. 1 comprising a light source 2 for illuminating an object not shown and comprises an adjustable optical element 3 for adjusting light 21 originating from the light source 2 and for supplying adjusted light 31 to the object. A controller 4 controls the adjustable optical element 3 via a driving signal 76 and/or the light source via a driving signal 75 in response to an adjusting control signal 71. The light source 2 is for example a flash light source or a continuous light source and may comprise a light emitting diode or an array of diodes or a xenon lamp or a halogen lamp.

In a preferred embodiment, the driving signal 75 to control the light source 2 is able to control light emitting diodes of an array of light emitting diodes individually in order to provide coloured light 21 or light 21 with adjustable color temperature, if the array of diodes comprise diodes emitting light with different colours.

The controller 4 comprises a processor 43 coupled to an interface 40 for receiving the adjusting control signal 71, optionally to an input interface 42 to receive the adjusting control signal 71 from a user 41, to a short-term memory 44 and to a long-term memory 45.

The present illumination device 1 does not require to shift a lens by hand for adjusting the light originating from the light source or to adjust the required intensity of light manually. Instead of that, the controller 4 adjusts light intensity and beam shape of the light 31 originating from the light source 2 in a more automatic way. As a result, the illumination device 1 according to the invention is more user friendly. A continuous light 31 with a lower intensity followed by flash light 21 provided by the light source 2 is effective for red eye reduction due to the eye reaction on the continuous light before applying flash light. Also continuous light 21 (e.g. of low intensity) supports the user in an dark environment to aim at the object before flashing the object to take a picture and/or will support the focusing procedure of a photo camera or a video camera before taking a photo or a movie.

An adjustable light 31 may also be used to highlight objects, to achieve optimized illumination of different objects, to change the beam shape of illuminated areas as a function of viewing angle or to adapt the beam shape to aspect ratios of e.g video or photo cameras.

An optical device 11 comprising the illumination device according to the invention shown in FIG. 2 comprises a light source 2 for illuminating an object not shown and comprises an adjustable optical element 3 for adjusting light 21 originating from the light source 2 and for supplying adjusted light 31 to the object. A controller 4 controls the adjustable optical element 3 via a driving signal 76 and/or the light source via a driving signal 75 in response to an adjusting control signal 71. The optical device 11 further comprises a zooming lens 5 for shooting the object such as for example taking a picture of the object or filming the object. The lens 5 is arranged to zoom 51 and receives object information 52 and supplies zoomed object information 53 to a detector 6.

The controller 4 comprises a processor 43 coupled to an input interface 42 for receiving an input 41 from a user, to a short-term memory 44, to a long-term memory 45 and to an auto-focus unit 46. The auto-focus unit 46 sends and receives signals 47 such as infrared signals for auto-focusing purposes and in response supplies an auto-focusing control signal 73 to the processor 43. The input interface 42 for example supplies a zooming control signal 72 and/or a further adjusting control signal 74 to the processor 43. The controller 4 (read: the processor 43) is arranged to, in response to the zooming control signal 72, control the zooming of the lens 5 via a lens control signal 78.

The controller 4 (read: the processor 43) further receives a digitized object signal 77 from the detector 6 and controls the light source 2 via a driving signal 75 and controls the adjustable optical element via an driving signal 76. The zooming control signal 72 is for example generated by the user and the adjusting control signal 71 is for example derived from the zooming control signal 72. By deriving the adjusting control signal 71 from the zooming control signal 72, the user's zooming is automatically converted into an adjustment of the light 21, for example such that the adjusted light 31 is focused just before, on or just after a position of the object. In addition, a light intensity control signal may further be derived from the zooming control signal 72, to automatically convert the user's zooming into an adjustment of the intensity of the light source 2.

Alternatively and/or further in addition, the adjusting control signal 71 is for example derived from the auto-focusing control signal 73. By deriving the adjusting control signal 71 from the auto-focusing control signal 73, the auto-focusing is automatically converted into an adjustment of the light 21, for example such that the adjusted light 31 is focused just before, on or just after a position of the object. In addition, a light intensity control signal may further be derived from the auto-focusing control signal 73 or the object signal 77, to automatically convert the auto-focusing into an adjustment of the intensity of the light source 2. Here the controller 4 is able to apply a driving signal 75 to the light source 2 in order to provide continuous light and/or flash light of different intensities for different time intervals. If only the required intensity, which is the sum of the intensity of the environmental light and the light emitted by the light source of the illumination device, is used to take a photo or a movie, one can safe energy to enlarge the operationable time of the illumination device. In order to achieve the right intensity of light the light source 2 may be fully dimmable. Also during flash operation, the intensity of flash light 21 can be decreased in response of the light received on the picture sensor 6 or conventional film 6.

Alternatively and/or yet further in addition, the further adjusting control signal 74 is for example generated by the user, to inform the controller 4 (the processor 43) of the user's preferences.

The adjustable optical element 3 might for example comprise a fluid focus lens (array) 80 as shown in FIG. 3. By for example supplying an alternating current voltage with an adjustable amplitude via conductors 81 and 82 to a polar liquid 86 of the fluid focus lens (array) 80, at an interface of the polar liquid 86 and an a-polar liquid 87 a meniscus is formed. This meniscus has three different modes 83-85 comprising a convex mode and/or a concave mode that may have adjustable amplitudes. This way, the cone angle of the outgoing light 31 can be adjusted, in view of the cone angle of the incoming light 21.

The adjustable optical element 3 might for example comprise various liquid crystalline materials as shown in FIGS. 4 and 5. In FIG. 4 a material 91 which scatters light without any voltage is shown. In other words when a zero Volt signal is supplied to transparent electrodes 90 and 92 present on substrates 190 and 191, the incoming light 21 is scattered, and, right side, when a sufficiently high voltage is supplied, the material 91 becomes transparent. In FIG. 5 another material which is transparent without a voltage being applied is shown. When the voltage across the transparent electrodes 93 and 95 present on substrates 193 and 195 is zero, the material 94 is transparent, and, right side, when a sufficiently high voltage is applied across the electrodes, the incoming light 21 becomes scattered.

The adjustable optical element 3 might for example comprise a liquid crystalline material as shown in FIG. 6. From the top to the bottom, a glass substrate 100, a transparent electrode 101, an orientation layer 102, liquid crystalline material 103, an isotropic layer 104, a transparent electrode 105 and a glass substrate 106 are present. By supplying a zero Volt signal or a non-zero Volt signal, the incoming light 21 is refracted or not, owing to the fact that upon application of an electric field the orientation of the liquid crystal molecules is altered and the light beam can pass without getting refracted. If both polarization directions need to be effected, two of such elements need to be used in a configuration where the orientations of liquid crystal molecules in the elements are orthogonal to each other. The orientation direction of the molecules can be kept the same however in that case a half wave plate need to be inserted between the elements.

The adjustable optical element 3 might for example comprise a so called chiral liquid crystalline as shown in FIG. 7. In a zero voltage state, a liquid crystal 112 reflects a band of circularly polarized light 31*a* and a band of circularly polarized light 31*b* with the opposite sense pass. A voltage across the transparent electrodes 111 and 113 placed on top of the glass substrates 110 and 114 removes a helical structure of the liquid crystal 112 and makes the cell transparent. In order to reflect both polarization directions a double cell configuration can be used. In this configuration one of the possibilities is to use cells containing chiral materials reflecting left and right polarization directions of circular polarized light. The other possibility is to use identical chiral material containing cells with a half wave plate in between.

The adjustable optical element 3 might be a liquid crystalline lens as shown in FIG. 8. Within the cell s structure 125 with a curvature is present. If the structure 125 is made of an isotropic material with a refractive index which is almost the same as one of the refractive indices as that of the liquid crystal, in zero voltage state, it works as a lens. Upon application of a voltage across the transparent electrodes 121 and 126 placed on top of glass substrates 120 and 127 liquid crystal molecules 123 are reoriented and the lens working disappears. The transparent electrode 121 is covered by an orientation layer 122 and the structure 125 is covered by an orientation layer 124. If the structure 125 is made of an anisotropic material with refractive indices almost the same as the refractive indices of that of the liquid crystal, in zero voltage state, no lens action is present. Upon application of a voltage across the transparent electrodes 121 and 126 placed on top of glass substrates 120 and 127 liquid crystal molecules 123 are reoriented and the lens working appears. A single element can work with only one linear polarization direction and therefore two elements are needed to influence both polarization directions. This is an example for a single lens, however it is also possible to make a lens array using such structures.

The adjustable optical element 3 might be a liquid crystalline refractive index gradient (GRIN) lens or array as shown in FIG. 9. Such an element comprises patterned electrodes. When both surfaces of the cell contain patterned electrodes the surfaces are aligned with respect to other so that the patterns show almost perfect overlap. In this situation the potential is highest between the electrodes. Outside the electrodes, field lines leak outside the cells resulting in non-uniform field lines. As a result, a refractive index gradient is formed in the area containing no electrodes. If the transparent electrodes contain circular holes, spherical lenses are formed, whereas use of line electrodes at a periodic distance can induce cylindrical lenses. The electrode geometry can also have other forms, examples of which are shown in FIG. 10. FIG. 9 shows a cell with patterned electrodes (131,136) on glass substrates (132,135) containing a liquid crystal (133). Macroscopic orientation of liquid crystal molecules is induced with orientation layers (132,135) made of rubbed polymer layers. Patterned electrodes can have any structure and various examples are shown in FIG. 10. When the applied voltage across the electrodes (131,136) is zero, liquid crystal molecules are oriented uni-axially and there is no lens working present within the cell as shown in the top drawing of FIG. 9 and the beam 21 passes through the cell without being altered. Application of an electric field across the cell as shown in the bottom drawing of FIG. 9 results in a reflective index gradient being induced in the region between the electrodes and the path of the light beam 21 is altered.

In an other embodiment the GRIN lens can be produced using a cell where only on one of the surfaces an electrode pattern is patterned an the other surface does not contain any pattern. In yet another embodiment the patterned electrode(s) is (are) covered by a layer with a very high surface resistance in the range Mega Ohm/square.

The GRIN lenses described above also show polarization dependence. If both polarization directions need to be effected, two of such elements need to be used in a configuration where the orientations of the liquid crystal molecules in the elements are orthogonal to each other. In both elements the orientation direction of the molecules can be kept the same, however in that case a half wave plate need to be inserted between the elements.

In this application it is important to have low losses due to reflections and absorptions. The GRIN concept described above can minimize these losses so that a higher transmission can be obtained.

So, an adjustable optical element that can change the light distribution and/or its shape can be placed in front of a collimated light source. However the adjustable optical element used for collimating and shaping the light can also be placed between the light source and one passive beam shaping element or in case of more than one passive beam shaping elements between the passive beam shaping elements. For example when a light emitting diode is used the as a light source 150, a reflector 140 and/or 141 with a certain shape can be used in order to obtain a light shape with a certain distribution. The adjustable optical element 151 can be therefore can be placed between passive beam shaping elements 140 and 141 as shown in FIG. 11. The passive beam shaping elements can also consists of several segments and the adjustable optical element 151 can be placed at any place along the passive beam shaping elements 140 and 141. For example a controllable scattering element can transmit in a transparent state a beam such that when a zoom function is used it mainly illuminates the zoomed object. When an object at a closer distance is to be photographed then the beam can be made broader using for example the controllable scattering element. In the same way certain parts of the object can be highlighted by adjusting the beam pattern. For example according to a decision of a person using the camera, one area might be illuminated more than one or more other areas, leading to highlighting those regions. However the controllable scattering element might be sending light to large angles which is not picked up by the camera lens which might lead to loses therefore it might be advantageous to place the adjustable optical element 151 between two passive beam shaping elements or place the adjustable optical element 151 between the light source 2 and the passive beam shaping elements 140 and 141 to make it part of the collimating optics as described above. Alternatively adjustable lenses or lens arrays can be used. In the same way as described above the element can be placed in front of the passive beam shaping element or incorporated in the in the passive beam shaping element structure.

It is also possible to segment the electrodes of the adjustable optical element for more control over the beam shape.

In another embodiment, a switching from direct lighting to indirect lighting and vice versa might be used. In that case, light originating from a source is partly or totally reflected so that it reaches the object after being for example reflected via the ceiling. In this way the object is indirectly illuminated.

Various examples of various liquid crystalline lenses can be found in the patent literature based on curved surfaces (U.S. Pat. No. 4,190,330, WO200459565), fresnel lenses zone plates made of patterned electrodes. By supplying for example an alternating current voltage with an adjustable amplitude to a liquid crystalline element, the collimation of a beam can be adjusted. Lenses can be based on a principle of electro wetting (WO0369380). By supplying an alternating current voltage with an adjustable amplitude to an electro wetting lens, the fluid can be made convex or concave. This way, the cone angle of the outgoing light can be adjusted. An other embodiment of the illumination device according to invention is electrically controllable scattering and/or diffracting. Effects based on polymer dispersed liquid crystals are common in the art Gels (U.S. Pat. No. 5,188,760) can be used for this purpose. It is also possible to change a direction of light in an element where a blazed grating structure is filled by liquid crystal and electric signals are used to control the orientation of liquid crystal molecules (U.S. Pat. No. 6,014, 197). Switchable reflectors (U.S. Pats. No. 5,798,057, 5,762, 823) can also be used in order to change a direction of the light. The adjustable optical element may alternatively comprise a switchable graded index liquid crystal element.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An optical device comprising an illumination device for illuminating an object, the illumination device comprising a light source to emit light, an adjustable optical element for adjusting the light originated from the light source into adjusted light, and a controller for controlling the adjustable optical element in reponse to an adjusting control signal via at least one driving signal, where the adjusting control signal is derived from an auto-focus control signal generated by an auto-focus unit of the optical device.

2. The optical device as claimed in claim 1, characterized in that the light source is arranged to provide light comprising continous light or flash light in response to a driving signal.

3. The optical device as claimed in claim 1, characterized in that the light source is arranged to provide continous light before providing flash light in response to a driving signal.

4. The optical device as claimed in claim 3, characterized in that the light source is arranged to provide continous light and/or flash light of different intensities for different time intervals in response to a driving signal.

5. The optical device as claimed in claim 1, characterized in that the light source comprises at least a light emitting diode or a xenon lamp or a halogen lamp.

6. The optical device as claimed in claim 1, characterized in that the adjustable optical element is arranged to provide adjusted light comprising a beam with an adjustable cone angle and/or an adjustable direction in response to a driving signal.

7. The optical device as claimed in claim 1, characterized in that the adjustable optical element is arranged to provide adjusted light with an adjustable aspect ratio of the light beam in response to a driving signal.

8. The optical device as claimed in claim 1, characterized in that the adjustable optical element comprises al least one element of the following group of optical elements comprising electro wetting lens, a liquid crystalline lens, a controllable scattering element, a controllable diffraction, refraction element and reflection element.

9. The optical device as claimed in claim 1, characterized in that the adjustable optical element comprises a liquid crystalline refractive index gradient element.

10. The optical device as claimed in claim 1, characterized in that the adjustable optical element comprises at least one passive beam shaping element and a controllable scattering element placed between the light source and the passive beam shaping element.

11. The optical device as claimed in claim 1, characterized in that the adjusting control signal is generated by a user.

12. The optical device as claimed in claim 1, the illumination device further comprising an interface to receive at least one adjustable control signal from the optical device comprising a video camera, a photo camera or a device with a camera function.

13. The optical device as claimed in claim 1 further comprising the zooming lens.

14. The optical device as claimed in claim 1, further comprising the auto-focus unit.

15. The optical device as claimed in claim 1, characterized in that the adjusting control signal is derived from a light intensity control signal generated by an object detector unit or the auto-focus unit.

16. The optical device as claimed in claim 1, characterized in that the adjusting control signal is derived from a user control signal generated by a user.

17. A controller for use in an illumination device of an optical device according to claim 1, the controller being arranged for controlling the adjustable optical element in response to an adjusting control signal via at least one driving signal, where the adjusting control signal is derived from an auto-focus control signal generated by an auto-focus unit of the optical device.

18. A computer program product to be run on a controller according to claim 17, the computer program product comprising the function of controlling the adjustable optical element in response to an adjusting control signal via at least one driving signal, where the adjusting control signal is derived from an auto-focus control signal generated by an auto-focus unit of the optical device.

* * * * *